(12) United States Patent
Goodman et al.

(10) Patent No.: US 12,197,611 B2
(45) Date of Patent: Jan. 14, 2025

(54) SYSTEM AND METHOD FOR SECURING DIAGNOSTIC DATA COLLECTION USING DATA CONTROL

(71) Applicant: Dell Products L.P., Round Rock, TX (US)

(72) Inventors: Bradley K. Goodman, Nashua, NH (US); Joseph Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 336 days.

(21) Appl. No.: 17/864,526

(22) Filed: Jul. 14, 2022

(65) Prior Publication Data

US 2024/0020404 A1    Jan. 18, 2024

(51) Int. Cl.
*G06F 21/62*  (2013.01)
*G06F 11/07*  (2006.01)
*G06F 11/30*  (2006.01)

(52) U.S. Cl.
CPC ...... *G06F 21/6218* (2013.01); *G06F 11/0709* (2013.01); *G06F 11/3003* (2013.01)

(58) Field of Classification Search
None
See application file for complete search history.

(56) References Cited

U.S. PATENT DOCUMENTS

| | | | |
|---|---|---|---|
| 11,184,463 B1* | 11/2021 | Reed | H04L 67/34 |
| 2013/0266127 A1* | 10/2013 | Schachter | G10L 25/48 |
| | | | 379/88.01 |
| 2015/0169886 A1* | 6/2015 | Bhagwan | G06F 21/6254 |
| | | | 726/26 |
| 2017/0161243 A1* | 6/2017 | Manoraj | G06F 40/169 |
| 2019/0213355 A1* | 7/2019 | Raviv | G06F 16/901 |
| 2021/0019442 A1* | 1/2021 | Patel | G06F 21/606 |
| 2021/0110059 A1* | 4/2021 | Kaul | G06F 11/302 |

* cited by examiner

*Primary Examiner* — Christopher C Harris
(74) *Attorney, Agent, or Firm* — Womble Bond Dickinson (US) LLP

(57) ABSTRACT

Methods and systems for managing the operation of data processing systems are disclosed. To manage the operation of data processing systems, diagnostic data may be collected. The diagnostic data may include information regarding the operation of the data processing systems usable to diagnose issues impacting the operation of the data processing systems. The diagnostic data may also include sensitive data that may be undesirable to disclose to third parties. To manage risk associated with distribution of the diagnostic data, the diagnostic data may be subjected to partial redaction and/or dual encryption to manage access to the sensitive data included therein. By redacting and/or dual encrypting portions of the sensitive data, access to the sensitive data after the diagnostic data is distributed may be prevented and/or limited to those parties to which an operator of a data processing system elects to provide decryption data.

20 Claims, 7 Drawing Sheets

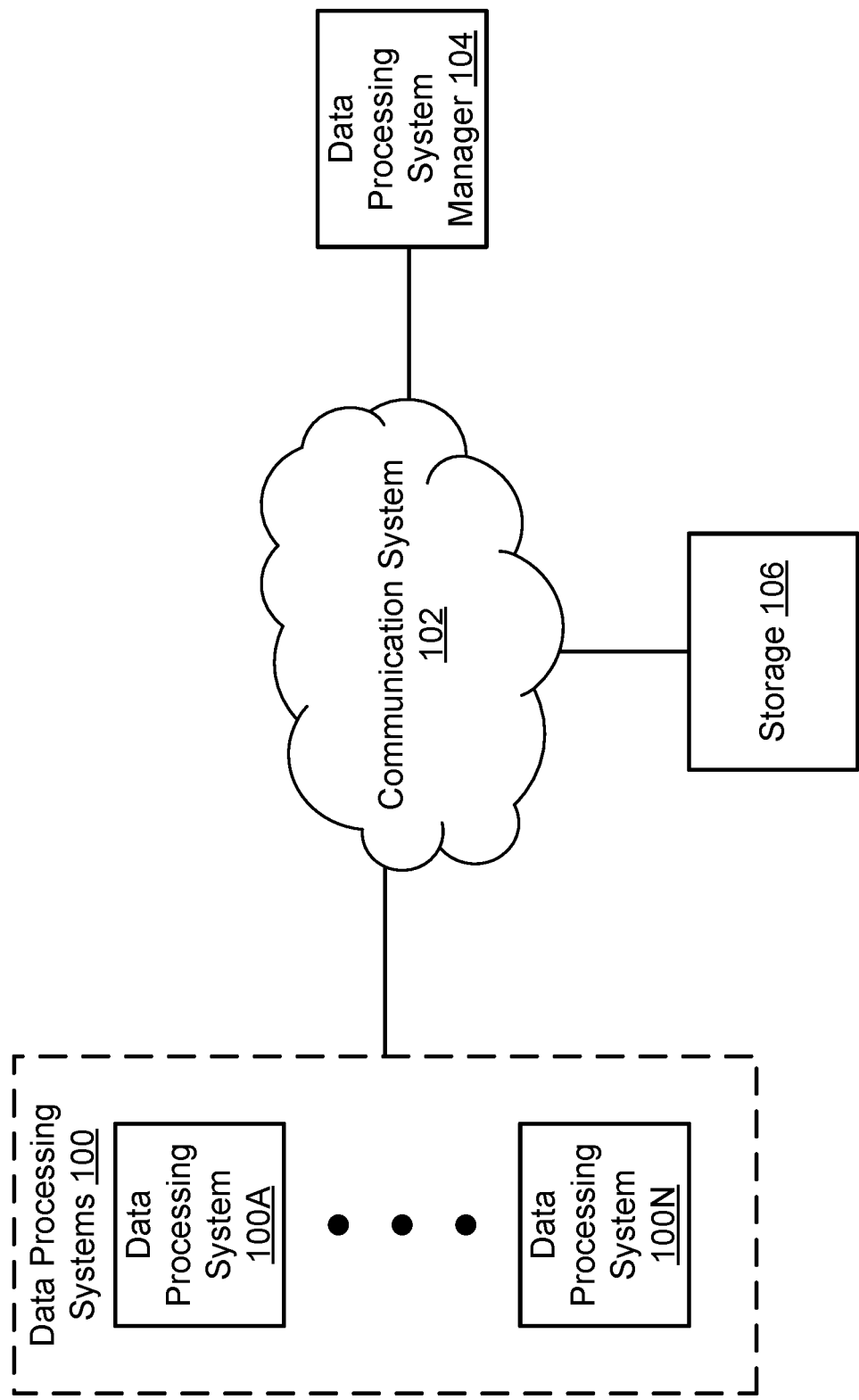

SYSTEM AND METHOD FOR SECURING DIAGNOSTIC DATA COLLECTION USING DATA CONTROL

FIELD

Embodiments disclosed herein relate generally to diagnostic management. More particularly, embodiments disclosed herein relate to systems and methods to manage the dissemination of diagnostic data.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

DETAILED DESCRIPTION

Figure 2A:
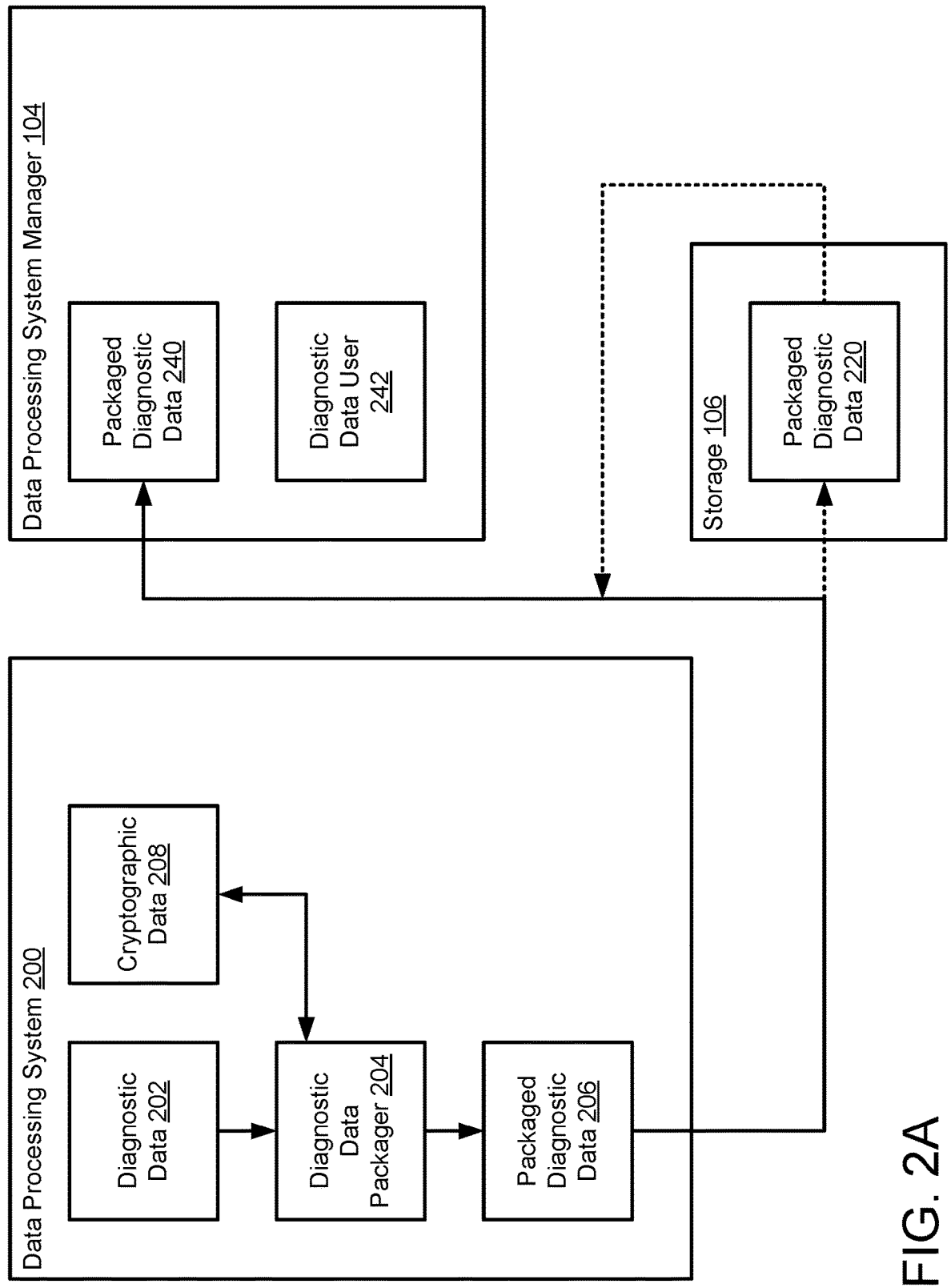
FIGS. 2A-2B show diagrams illustrated data flows, processes, and other aspects of a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing the operation of data processing systems. To manage the operation of data processing systems, diagnostic data may be collected. The diagnostic data may include information regarding the operation of the data processing systems usable to diagnose issues impacting the operation of the data processing systems. The diagnostic data may also include sensitive data that may be undesirable to disclose to third parties. For example, the diagnostic data may include information usable by a malicious party to compromise the data processing systems.

To manage risk associated with distribution of the diagnostic data, the diagnostic data may be subjected to partial redaction and/or dual encryption to manage access to the sensitive data included therein. By redacting and/or dual encrypting portions of the sensitive data, access to the sensitive data after the diagnostic data is distributed may be prevented and/or limited to those parties to which an operator of a data processing system elects to provide decryption data. For example, the sensitive data may dual encrypted using encryption data controlled by the operator of the data processing system and a requestor that may desire access to the diagnostic data.

By doing so, embodiments disclosed herein may reduce risk associated with diagnostic data distribution while facilitating responsible distribution of the diagnostic data with retained access controls for the distributed diagnostic data. Thus, embodiments disclosed herein may address the technical problem of data security in a distributed system where different actors in the system may enforce security policies with greater or lesser degrees of protection for data stored in the systems. By limiting access to sensitive data even after dissemination through encryption based access controls, embodiments disclosed herein may reduce the impact of relaxed security policies implemented by various systems in the distributed system.

In an embodiment, a method for managing operation of data processing systems through mediation of selective access to diagnostic data is provided. The method may include identifying an occurrence of a collection event for the diagnostic data from a data processing system of the data processing systems; obtaining a diagnostic data package using a selectively redacted version of the diagnostic data based on sensitivity of portions of the diagnostic data; and providing the diagnostic data package to a data processing systems manager.

Obtaining the diagnostic data package may include presenting information regarding a subset of the portions of the diagnostic (e.g., units such as different files, logs, etc.) data provisionally selected for inclusion in the diagnostic data package (e.g., as requested by a user) to a privileged user that has a level of privilege that affords the privileged user with authority disclose the subset of the portions of the diagnostic data to third parties; obtaining user feedback from the privileged use that is responsive to the presented information, the user feedback indicating: a first element (e.g., a unit such as a log, or portion thereof) of the subset of the portions of the diagnostic data is acceptable for third party disclosure, and a second element of the subset of the portions of the diagnostic data is not acceptable for third party disclosure; adding the first element to the diagnostic data package; and adding a redacted version of the second element to the diagnostic data package.

The redacted version of the second element may include an empty data element (e.g., a portion redacted by removal but retained the zeroes out bits to indicate that a redaction has occurred). Adding the redacted version of the second element may include omitting all information regarding the second element from the diagnostic data package (e.g., to hide the fact that a redaction has occurred).

The information regarding the subset of the portions of the diagnostic data may include type information for data elements of the subset of the portions of the diagnostic data. The information regarding the subset of the portions of the diagnostic data may not include contents of the data elements.

The subset of the portions of the diagnostic data may be selected by a requestor, the collection event may be a request from the requestor for the subset of the portions of the diagnostic data, and the requestor may be a vendor of a product associated with the data processing system.

Obtaining the diagnostic data package may include selecting a subset of the portions of the diagnostic data based on sensitivity selection criteria; adding the selected subset of the portions of the diagnostic data to the diagnostic data package; and omitting other portions of the diagnostic data that are not members of the subset from the diagnostic data package.

The selection criteria may include pattern rules. The selection criteria may include at least one selected from a group of criteria consisting of time ranges, service types, and information types.

In an embodiment, a method for managing operation of data processing systems through mediation of selective access to diagnostic data is provided. The method may include identifying an occurrence of a collection event for the diagnostic data from a data processing system of the data processing systems; obtaining a diagnostic data package using the diagnostic data and cryptographic data for two parties, the diagnostic data package requiring use of decryption data for both of the two parties for decryption; providing the diagnostic data package to a data processing systems manager; obtaining an access request for the diagnostic data from a requestor; making a determination regarding whether the access request is acceptable; in an instance where the determination indicates that the access request is acceptable: providing the requestor with access to the diagnostic data using the diagnostic data package and a portion of the decryption data; and in an instance where the determination indicates that the access request is not acceptable: rejecting the access request.

The portion of the decryption data may be for a first of the two parties, the first of the two parties being a user of the data processing system that has a level of privilege that affords the user with privilege to make the determination.

Making the determination may include presenting information regarding the access request to the user; obtaining user feedback from the user that is responsive to the presented information, the user feedback indicating whether the access request is acceptable; and making the determination based on the user feedback.

The diagnostic data package may include portions, and the portion of the decryption data may only allow for a subset of the portions to be decrypted.

Obtaining the diagnostic data package may include presenting second information regarding the portions of the diagnostic data package to the user; obtaining second user feedback from the user that is responsive to the presented second information, the second user feedback indicating the subset of the portions; encrypting the subset of the portions using first encryption data complementary to the portion of the decryption data; and encrypting other subsets of the portions using second encryption data that is not complementary to the portion of the decryption data, other portions of the decryption data that is complementary to the second encryption data being unavailable to the requestor.

The cryptographic data may include first encryption data provided by a vendor of a product used by an operator of the data processing system; and second encryption data controlled by the operator. The diagnostic data may include at least one data structure from a group of data structures consisting of: a log for operation of the product; a crash dump for a crash by the product; and configuration data for the product.

The second encryption data may include a cryptographic key maintained by the operator and/or a password maintained by the operator.

The operator may maintain a plurality of passwords comprising the password, the second encryption data may include the plurality of passwords, and at least some different portions of diagnostic data added to the diagnostic data package may be encrypted using different passwords of the plurality of passwords to enable the operator to selectively disclose a portion of the plurality of passwords to facilitate the selective access to the diagnostic data by the vendor.

The collection event may be one selected from a group of events consisting of: an error in operation of the product; and a receipt of a request from the vendor for a portion of the diagnostic data.

A non-transitory media may include instructions that when executed by a processor cause one or more of the computer-implemented methods to be performed.

A data processing system may include the non-transitory media and a processor, and may perform one or more of the computer-implemented methods when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer-implemented services, the system may include any number of data processing systems 100. Data processing systems 100 may provide the computer implemented services to users of data processing systems 100 and/or to other devices (not shown). Different data processing systems (e.g., 100A, 100N) may provide similar or different computer implemented services.

To provide the computer-implemented services, data processing systems 100 may include various hardware components (e.g., processors, memory modules, storage devices, etc.) and host various software components (e.g., operating systems, application, startup managers such as basic input-output systems, etc.). These hardware and software components may provide the computer-implemented services via their operation.

To provide certain computer-implemented services, the hardware and/or software components may need to operate in predetermined manners. If the hardware and/or software components do not operate in the predetermined manners, then a data processing system may be unable to provide all, or a portion, of the computer-implemented services that it normally provides.

The hardware and/or software components of data processing systems 100 may operate differently (e.g., in an undesirable manner) from the predetermined manners for any number of reasons. For example, any of the hardware and/or software components may malfunction. In another example, the hardware and/or software components may be operating nominally but in undesirable manners through various interactions such as resource conflicts or constraints. In a further example, various configuration settings of the hardware and/or software components may be set (intentionally or inadvertently) in a manner that causes the operation of data processing systems 100 to be undesirable. The hardware and/or software components of data processing systems 100 may operate differently from the predetermined manners for other reasons (e.g., various root causes) without departing from embodiments disclosed herein. Thus, a data processing may not provide (entirely, or in part due to some degree of impairments of) its computer-implemented services for any number of reasons which may be difficult to identify.

Additionally, to improve the quality of the computer-implemented services, the operation of the hardware and/or software components may be analyzed. For example, various series of operations by these hardware and/or software components may be analyzed to identify how to modify the operation of the hardware and/or software components in the future to more efficient provide the computer implemented services, to provide additional features, and/or to convey other types of benefits for the future operation of data processing systems 100.

As part of their operation, data processing systems 100 may record information regarding their operation. The recorded information may include, for example, logs of operation, crash dumps (which may include memory information and/or other information) for errors in operation of hardware/software components, and/or other types of information (e.g., in aggregate referred to as "diagnostic data"). The diagnostic data may be used, for example, to identify why data processing systems operated in undesired manners, to improve the operation of hardware/software components, and/or for other purposes.

For example, vendors or other entities (e.g., owners) tasked with managing operation of data processing systems 100 may utilize the diagnostic data for any of the aforementioned purposes. Vendors or the other entities may use data processing system manager 104 and/or storage 106 to obtain, manage, and/or utilize diagnostic data from data processing systems 100.

In general, embodiments disclosed herein may provide methods, systems, and/or devices for managing the operation of data processing systems through management of diagnostic data. When diagnostic data is obtained by a data processing system, the diagnostic data may include various portions of sensitive data. The sensitive data may include, for example, information regarding data organization, hardware/software components, and/or other types of information regarding data processing systems 100.

The sensitive data may present risk to data processing systems 100 (and/or other entities). For example, a malicious party may utilize the sensitive data to compromise a data processing system (or other system not shown in FIG. 1). In another example, the sensitive data may include trade secrets or other types of information that presents business risk to a business that owns data processing systems 100. The sensitive data may present other types of risks without departing from embodiments disclosed herein.

To manage the operation of data processing systems 100, a system in accordance with embodiments disclosed herein may proactively limit the disclosure of and/or use of diagnostic data. To limit the disclosure and/or use of diagnostic data, the system may (i) identify sensitive data within the diagnostic data, (ii) dual encrypt portions of the sensitive data included in diagnostic data packages provided to other entities, and/or (iii) selectively redact information requested to be included in diagnostic data packages based on a sensitively level of the diagnostic data included in the diagnostic data packages. Thus, in some embodiments, diagnostic data may be dual encrypted and/or include partially redacted information. By doing so, embodiments disclosed herein may limit the disclosure and use of diagnostic data to limit risk in dissemination of the diagnostic data.

To dual encrypt portions of the sensitive data included in diagnostic data packages, the system may encrypt the portions of the diagnostic data using two portions of encryption data. One of the portions of the encryption data (e.g., a key, password, etc.) may be controlled by a requestor or other entities that desires access to some or all of the diagnostic data. The other portion of the encryption data (e.g., a key, password, etc.) may be controlled by a provider of requested diagnostic data. Consequently, the resulting diagnostic data package may require corresponding portions of decryption data (e.g., keys, passwords, etc.) to access the information included in the diagnostic data package. Accordingly, even after a diagnostic data package is disseminated, there information included therein may not present a similar level of risk as the diagnostic data itself and may facilitate selective disclosure of diagnostic data.

To selectively redact information requested to be included in diagnostic data packages, the requested information may be subjected to analysis and redaction prior to being added to a diagnostic data package. For example, the requested information (e.g., portions of diagnostic data) may be subject to rules based, criteria based, inference based, and/or other types of analysis to identify a level of risk with respect to dissemination of portions of the requested information. The redacted forms of the requested may be added to a diagnostic data package prior to dissemination, with the level of redactions being keyed to the level of risk (e.g., level of sensitivity) of the portions of the requested information.

For example, a vendor may request that all diagnostic data collected for a piece of software be provided to the vendor. However, the diagnostic data may include lists of other software hosted by a data processing system (e.g., to identify potential conflicts between the vendor software and the other software). This information may present a high level of risk with respect to compromise of the data processing system. The redaction process may facilitate removal these lists so that an operator of the data processing system may improve the security profile of its assets while still enabling the vendor to obtain some of the diagnostic information which may enable the vendor to improve its software.

In an embodiment, data processing systems 100 utilize storage 106 to disseminate one or more diagnostic data packages. Storage 106 may provide file storage services and may allow data processing systems manager 104 to obtain copies of hosted data. Consequently, data processing system manager 104 may indirectly obtain copies of diagnostic data packages. For example, the operators of data processing systems 100 may elect to store diagnostic data packages in storage 106 until (i) a sufficiently large incident occurs with respect to vendor supported product or (ii) a vendor provides a request with sufficient reasons to warrant dissemination of a diagnostic data package. In the response to the occurrence of such events, the operation of data processing systems 100 may direct data processing system manager 104 (which may be operated by a vendor) to storage 106 and/or provide the operation thereof with access privilege to storage 106.

Figure 2B:
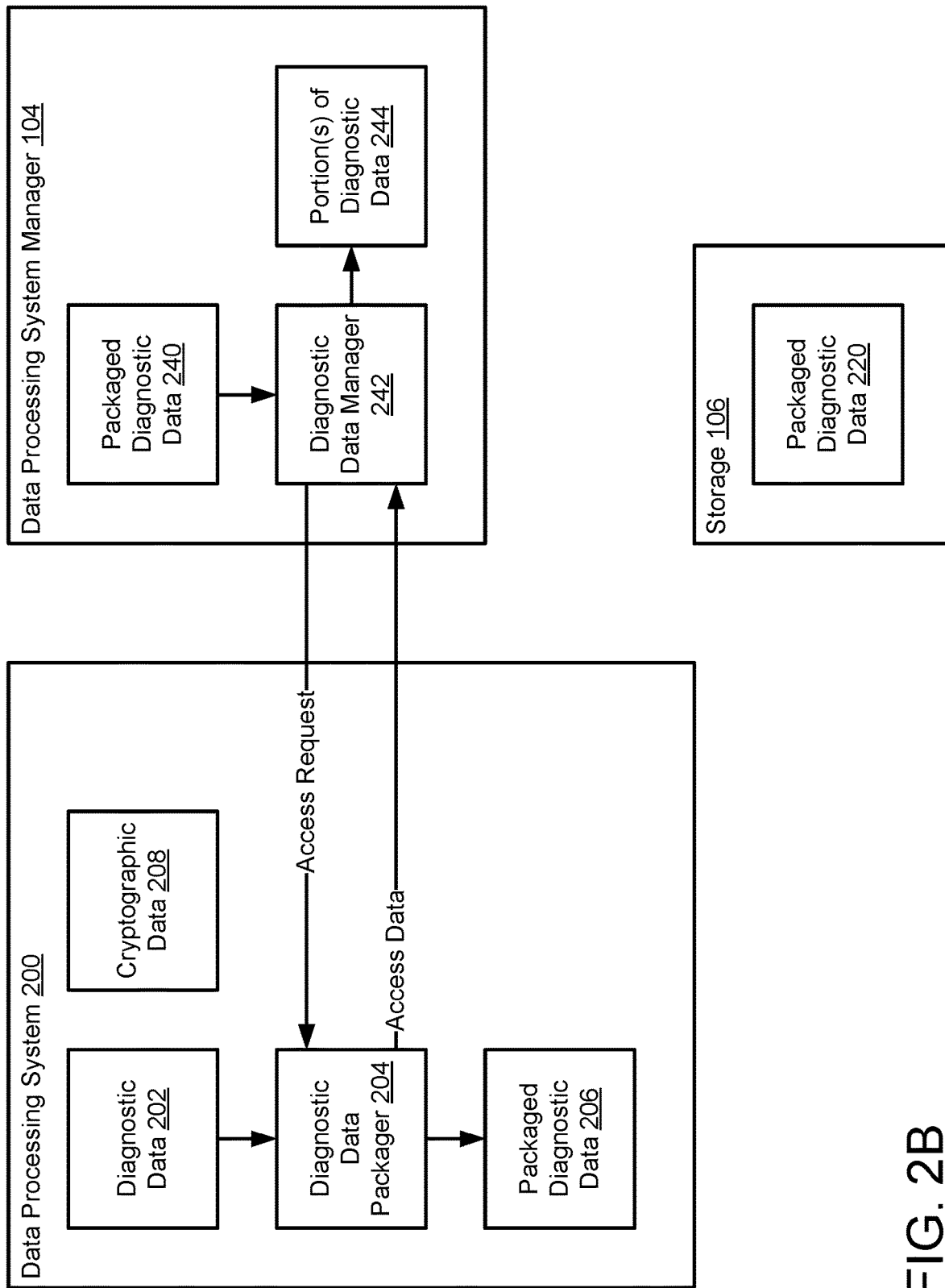
Figure 2C:
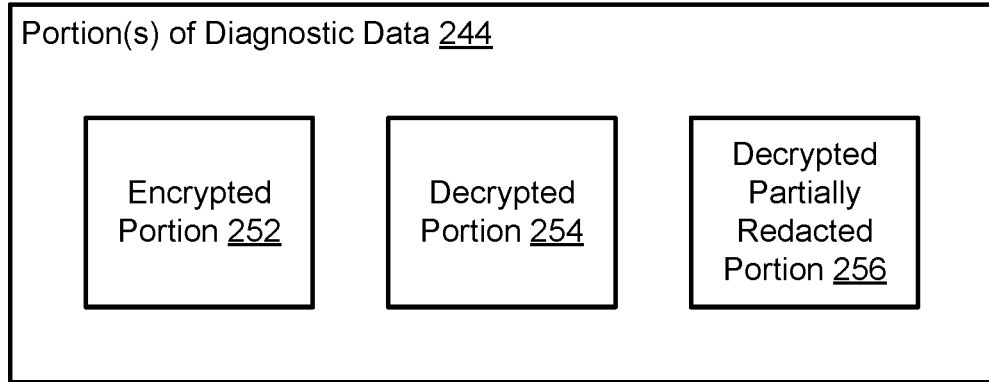
FIG. 2C shows a diagram illustrating a data structure usable by a system in accordance with an embodiment.
Figure 3A:
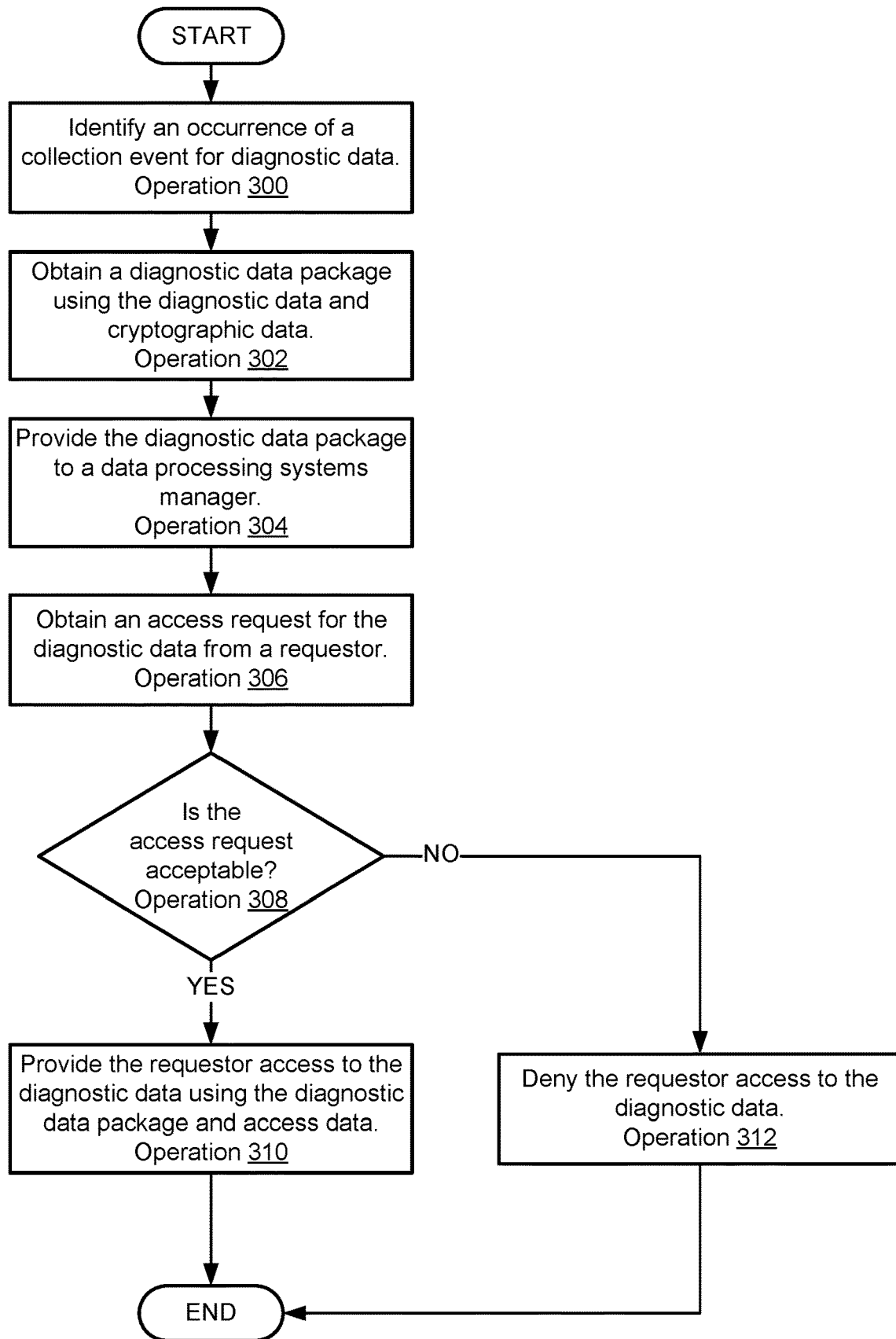
FIG. 3A shows a flow diagram illustrating a method of managing diagnostic data through dual encryption in accordance with an embodiment.
Figure 3B:
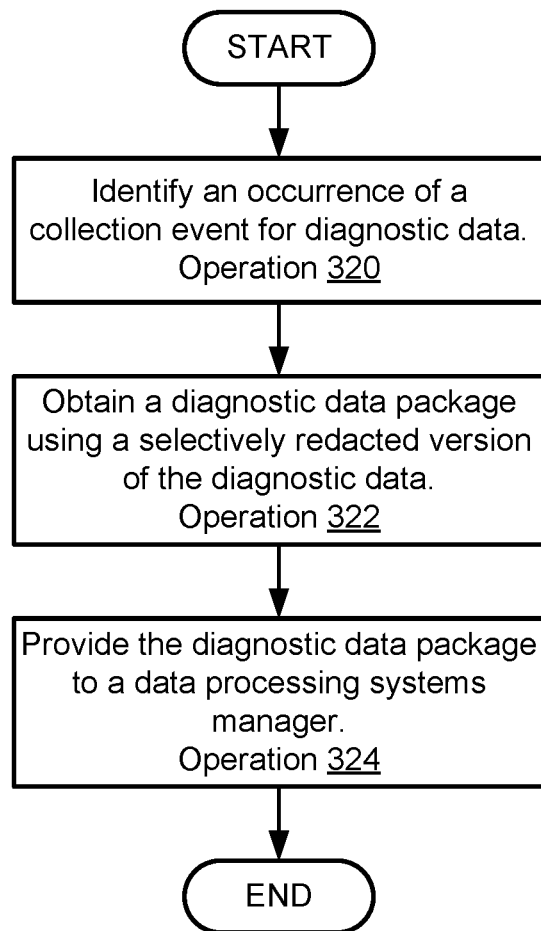
FIG. 3B shows a flow diagram illustrating a method of managing diagnostic data through redaction in accordance with an embodiment.

When providing its functionality, data processing systems 100, data processing systems manager 104, and/or storage 106 may perform all, or a portion, of the methods illustrated in FIGS. 3A-3B. Refer to FIGS. 2A-2C for additional details regarding data processing systems 100.

Any of data processing systems 100, data processing systems manager 104, and/or storage 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with a communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

To further clarify embodiments disclosed herein, diagrams illustrating data flows implemented by and data structures used by a system over time in accordance with an embodiment are shown in FIGS. 2A-B and FIG. 2C, respectively.

Turning to FIG. 2A, a data flow diagram illustrating data flows, data processing, and/or other operations that may be performed the system of FIG. 1 in accordance with an embodiment is shown. Data processing system 200 may be similar to any of data processing systems 100.

To manage its operation, data processing system 200 may obtain diagnostic data 202. Diagnostic data 202 may include any type and quantity of information regarding data processing system 200 and/or the operation thereof. Diagnostic data 202 may be usable by third parties (e.g., vendors) to improve or remediate (e.g., if undesirable due to an error, compromise, etc.) the operation of data processing systems 200. However, as noted above, diagnostic data 202 may include any type and quantity of sensitive information.

To manage risk associated with disseminating potentially sensitive information, diagnostic data packager 204 may generate packaged diagnostic data 206 (e.g., a diagnostic data package) that reduces the risk associated with dissemination of potentially sensitive information. To do so, diagnostic data packager 204 may partially redact and/or dual encrypt information included in diagnostic data packager 204 (in an embodiment, diagnostic data 202 is automatically encrypted using third party encryption data through the process of collecting it and, therefore, may only need to be encrypted using encryption data that the operator of data processing system 200 controls). For example, cryptographic data 208 may include (i) encryption data controller by an operator of data processing system 200 and (ii) encryption data controlled by a requestor of all, or a portion, of diagnostic data 202. Diagnostic data packager 204 may add and dual encrypt data from diagnostic data 202 to packaged diagnostic data 206 to obtain a data structure that requires access to two piece of encryption data to unlock.

Packaged diagnostic data 206 may be provided to data processing systems manager 104 (e.g., directly as indicated by the solid lines terminating in arrows between packaged diagnostic data 206 and packaged diagnostic data 240), and which may store as packaged diagnostic data 240), or to storage 106 (which may store a copy as packaged diagnostic data 220) and through which selective access may be provided to data processing system manager 104 (e.g., in response to requests from the operator of data processing system manager 104, and as indicated by the dashed lines terminating in arrows).

Once obtained, the contents of packaged diagnostic data 240 may not be usable by data processing system manager 104 until dual decrypted or may only obtain a portion of the requested content from diagnostic data 202 due to redaction implemented by diagnostic data packager 204.

In a scenario in which packaged diagnostic data 240 is dual encrypted, data processing system manager 104 may need access to decryption data from data processing system 200. Turning to FIG. 2B, the decryption data may be obtained by diagnostic data manager 242 sending an access request to data processing system 200 (or another entity that manages the decryption/encryption data for data processing system 200). Access data may be provided in response to the access request thereby allowing diagnostic data manager 242 to dual decrypt packaged diagnostic data 240 to obtain portion(s) of diagnostic data 244. Portion(s) of diagnostic data 244 may (i) include some of the requested data due to partial redaction and (ii) only include a portion of the encrypted data of packaged diagnostic data 240 due to use of multiple portions of encryption data thereby allowing the operator of data processing system 200 to facilitate selective granular decryption of portions of dual encrypted data of packaged diagnostic data 240. Refer to FIG. 2C for additional details regarding portion(s) of diagnostic data 244.

In an embodiment, one or more of diagnostic data packager 204 and diagnostic data manager 242 are implemented using a hardware device including circuitry. The hardware device may be, for example, a digital signal processor, a field programmable gate array, or an application specific integrated circuit. The circuitry may be adapted to cause the hardware device to perform the functionality of diagnostic data packager 204 and/or diagnostic data manager 242. Diagnostic data packager 204 and/or diagnostic data manager 242 may be implemented using other types of hardware devices without departing embodiment disclosed herein.

In one embodiment, one or more of diagnostic data packager 204 and diagnostic data manager 242 an implemented using a processor adapted to execute computing code stored on a persistent storage that when executed by the processor performs the functionality of diagnostic data packager 204 and/or diagnostic data manager 242 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, one or more of data processing system 200, data processing system manager 104, and storage 106 includes storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Any of the storages may store data structures including diagnostic data 202, packaged diagnostic data 206, 220, 240, cryptographic data 208, and portion(s) of diagnostic data 244, and/or other types of information. Any of these data structures may be implemented using, for example, lists, tables databases, linked lists, unstructured data, and/or other types of data structures.

While data processing system 200 and data processing system manager 104 are illustrated in FIG. 2A as including a select number of components and as storing specific types of information, data processing system 200 and/or data processing system manager 104 may include different components and may store other types of data without departing from embodiments disclosed herein.

Turning to FIG. 2C, a diagram of portion(s) of diagnostic data 244 in accordance with an embodiment is shown. As discussed above, portion(s) of diagnostic data 244 may include information disseminated to a third party and may include sensitive information. To reduce the risk from disseminating sensitive information, the aforementioned data may include provide access to all requested information.

For example, portion(s) of diagnostic data 244 may include any number of encrypted portions 252, decrypted portion 254, and decrypted partially redacted portion 256. Any of the instances of these portions may be similar or different from the other instances of the respective portions.

Encrypted portion 252 may be a portion that remains encrypted after performance of a dual decryption procedure. Encrypted portion 252 may remain encrypted (or otherwise interpretable) following the dual decryption procedure because the decryption data used to perform the dual decryption may only be usable to decrypt other portions of a diagnostic data package. Thus, an operator of a data processing system may still limit access to disseminated diagnostic data after distribution of the diagnostic data package.

Decrypted portion 254 may be a portion that is interpretable following a dual decryption. Thus, an operator of a data processing system may have provided access data usable to decrypt a dual encrypted portion of the diagnostic data package for decrypted portion 254 to be obtained.

Decrypted partially redacted portion 256 may, like decrypted portion 254, be interpretable following a dual decryption. However, unlike decrypted portion 254, some or all of the content of the decrypted portion may have been redacted prior to encryption. Thus, decrypted partially redacted portion 256 may include a limited amount of data usable by an entity that has access to a diagnostic data package and corresponding dual decryption data.

In the event that some of a diagnostic data package is not dual encrypted, then either of decrypted portion 254 and decrypted partially redacted portion 256 may only need to be singly decrypted (e.g., using a vendor's decryption data and that requested the diagnostic data package and that caused the diagnostic data therein to be encrypted using the vendor's encryption data).

As discussed above, the components of FIG. 1 may perform various methods to manage data processing systems through control of dissemination of diagnostic data, and access thereof. FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing diagnostic data dissemination in accordance with an embodiment is shown. The method may be performed by a data processing system or other components of the system shown in FIG. 1.

At operation 300, an occurrence of a collection event for diagnostic data is identified. The occurrence may be identified by (i) monitoring operation of a data processing system from which the diagnostic data will be disseminated and (ii) comparing the operation of the data processing system to one or more criteria. The criteria may include, for example, (i) an error in the operation of hardware and/or software component of the data processing system, (ii) receipt of a request for all or a portion of the diagnostic data, (iii) occurrence of points in time (e.g., in accordance with a schedule), and/or (iv) other criteria. The occurrence of any of the above criteria may be considered an occurrence of a collection event.

The diagnostic data, as noted above, may be continuously collected by a data processing system (e.g., in accordance with a collection plan), collected in response to the collection event, and/or via other collection modalities. The diagnostic data may be stored in a storage of the data processing system, may include any quantity and type of data, may include sensitive data, may or may not include metadata, and/or may be encrypted, entirely or in part, with encryption data associated with an entity that may have an interest the hardware and/or software component for which with diagnostic data is collected.

For example, the entity may be a vendor that provided the hardware and/or software component. The vendor may provide encryption data such as a key, password, and/or other data structure which may be used to automatically encrypt portions of the diagnostic data, and may provide an application that automatically collects and encrypts the diagnostic data locally. The operator of the data processing system from which the diagnostic data is collected may not have access to decryption data for the encrypted data thereby allowing the vendor to maintain a level of secrecy with respect to the diagnostic data.

At operation 302, a diagnostic data package is obtained using the diagnostic data and cryptographic data (e.g., encryption data). The diagnostic data package may be obtained by (i) identifying portions of the diagnostic data to be provided to another entity, and (ii) making encrypted additions of all, or a portion, of the portions of the diagnostic data to the diagnostic data package using a portion of the cryptographic data.

The cryptographic data may include (i) encryption data controlled by an operator of the data processing system and/or (ii) encryption data controlled by a requestor. For example, the encryption data controlled by the requestor may include a key or password controlled by a vendor which may be responsible for maintaining all or a portion of the functionality of the data processing system and may desire access to diagnostic data to meet that responsibility. In contrast, the encryption data controlled by the data processing system operator may include a key or password controlled by the data processing system operator.

If the diagnostic data package is obtained through dual encryption, the data added to the diagnostic data package may only be unlocked using both keys. Thus, even after the diagnostic data package is distributed to other entities, access to the data therein may still be controlled by the operator of the data processing system.

In an embodiment, the data (or portions thereof) added to the diagnostic data package is encrypted using multiple portions of encryption data controlled by the data processing system operator. Consequently, different portions of the data of the diagnostic data package may require different portions of decryption data (e.g., passwords, keys) controlled by the data processing system operator to be unlocked. As will be discussed with respect to operation 310, the aforementioned granular access capability may be used by the data processing system operator to limit risk due to dissemination of potentially sensitive information via distribution of diagnostic data packages.

At operation 304, the diagnostic data package is provided to a data processing systems manager. The diagnostic data package may be provided directly or indirectly. If provided directly, the diagnostic data package may be sent to the data processing systems manager (e.g., a requestor). If provided indirectly, the diagnostic data package may be stored in a storage, and the data processing systems manager may gain access to the diagnostic data package through the storage. To gain access to the diagnostic data package through the storage, access information (e.g., location, passwords, credentials, etc.) may be provided to the data processing system manager (which may be provided sometime after, concurrently with, and/or prior to storage of the diagnostic data package in the storage.

At operation 306, an access request for the diagnostic data is obtained from the requestor. The access request may be obtained by receiving it, directly or indirectly, from the requestor (e.g., the data processing system manager). For example, if received indirectly, an agent for the data processing system (or an operator of the data processing system) may receive the access request.

The access request may indicate (i) a basis for the request, (ii) identifiers of one or more portions of the diagnostic data package for which access is being requested, (iii) security information (e.g., signatures) usable to validate that the request is from the requestor, and/or (iv) other types of information used to define parameters of the request. The basis for the request may be defined granularly, or at a macro level, and may include, for example, justifications for why access should be granted. For example, the justifications may include contractual agreements between the requestor and the data processing system operator, benefits that may be provided through the access, and/or other types of information.

A requestor may send the access request in response to identifying that portions of the diagnostic data package are dual encrypted. The requestor may desire to use the information included in the diagnostic data package for various purposes such as meeting contract obligation, improving of product offerings, and/or other purposes.

At operation 308, a determination is made regarding whether the access request is acceptable. The determination may be made through automated review and/or through confirmation of the acceptability of the access request via a person such as an administrator or other privileged person with sufficient privilege to grant dissemination of the information included in the diagnostic data package.

The automated review may include, for example, cross referencing identifiers, cryptographic data, and/or other information in the access request with similar information in a database. The cross referencing process may be used to lookup an acceptability of the access request, and/or acceptability of granting access to a portion of the access requested. The database may associate various requestors with the acceptability (or level of acceptability) of providing access to data from the diagnostic data package indicated by the access request.

The acceptability of the access request may be confirmed by presenting information regarding the access request to the person (e.g., via a user interface). The person may provide user feedback indicating the acceptability (or level of acceptability) of providing access to the data from the diagnostic data package indicated by the access request. For example, like the automated acceptability, the person provided acceptability may indicate that only some of the data indicated by the request is acceptable for dissemination.

If any automated and/or confirmed acceptability indicate that any of the requested data is acceptable for dissemination, then it may be determined that the access request is acceptable.

If the automated and/or confirmed acceptability of the access request indicate that the access request is acceptable, then the method may proceed to operation 310. Otherwise the method may proceed to operation 312.

At operation 310, the requestor is provided with access to the diagnostic data using the diagnostic data package and access data (e.g., decryption data controlled by the data processing system owner). The access to the diagnostic data may be provided by providing one or more portions of decryption data which may be used to dual decrypt corresponding portions of the diagnostic data package. The resulting decrypted data may include all or a portion of the data requested by the access request. For example, as noted above, an access request may be treated as acceptable if any of the requested data from the diagnostic data package is acceptable for disclosure to the requestor. The one or more portions of the decryption data may correspond to only those portions of the diagnostic data package that include diagnostic data acceptable for disclosure to the requestor. In this manner, the data processing system operator may granularly control access to various portions of the diagnostic data included in the diagnostic data package. Thus, the requestor may only be able to access some of the diagnostic data included in the diagnostic data package.

The method may end following operation 310.

Returning to operation 308, the method may proceed to operation 312 following operation 308 when it is determined that the access request is not acceptable.

At operation 312, the requestor is denied access to the diagnostic data. The requestor may be denied access to the diagnostic data by withholding access data for the diagnostic data package.

The method may end following operation 312.

Using the method illustrated in FIG. 3A, embodiments disclosed herein may facilitate granular control of diagnostic data from data processing systems by the operators thereby even after the diagnostic data is distributed to other entities, while enabling the other entities selective access to the diagnostic data that is acceptable to the operators of the data processing systems.

Turning to FIG. 3B, a flow diagram illustrating a method of managing diagnostic data dissemination in accordance with an embodiment is shown. The method may be performed by a data processing system or other components of the system shown in FIG. 1. The methods shown in FIGS. 3A-3B may be performed as part of the same or different processes with respect to managing diagnostic data dissemination.

At operation 320, an occurrence of a collection event for diagnostic data is identified. The occurrence may be identified similarly to that described with respect to operation 300, shown in FIG. 3A.

At operation 322, a diagnostic data package is obtained using a selectively redacted version of the diagnostic data. diagnostic data package may be obtained by (i) identifying portions of the diagnostic data to be provided to another entity, (ii) identifying any of the portions of the diagnostic data that include sensitive data, (iii) identifying sensitivity levels of the sensitive data, and (iv) applying one or more redaction techniques when adding the portions of the diagnostic data based on the sensitivity levels of the sensitive data included in the portions of the diagnostic data to the diagnostic data package.

The portions of the diagnostic data that include sensitive data may be identified, for example, (i) via manual review by a person, (ii) via pattern rule analysis, (iii) via classification or categorization using a corresponding classification or categorization system (e.g., data type analysis), (iv) through filtering (e.g., key word), (v) through associative analysis with respect to services provided by the data processing system from which the diagnostic data is obtained, (vi) via time period analysis, and/or (vii) via other methods. The manual review may include presenting information regarding each (or some) of the portions to a person (e.g., via a user interface), receiving feedback from the user regarding the presented information, and making the identification based on the user feedback which may indicate which of the portions include the user feedback.

In an embodiment, the pattern rule analysis is performed using a set of rules that define an evaluation framework for determine whether a portion includes sensitive data. The set of rules may operate on information included in each of the portions. The set of rules may be implemented via an explicit rule engine or via an inference model such as a trained machine learning model (e.g., a trained neural network trained using a training data set that includes labeled examples of portions that either include or do not include sensitive data).

The associate analysis may be performed by identifying a service that generates or otherwise uses the diagnostic data upon which each portion is based. The identity of the service (and/or identity of the requestor or other information) may be used to lookup (e.g., using a lookup data structure) the acceptability of the portion.

The time period analysis may be performed by identifying when the diagnostic data upon which each portion is based was created, last accessed, last modified, etc. The aforementioned time period information may be used to lookup (e.g., using a lookup data structure) the acceptability of the portion. For example, a lookup data structure may indicate that the diagnostic data may need to be aged (e.g., old) or new (e.g., recently created) for it to be acceptable for dissemination.

The sensitivity level of the sensitive data of a portion may be identified using a rating scheme. The rating scheme may define sensitivity levels of the sensitive data on the basis of one or more of (i) a type of the sensitive data, (ii) an age of the sensitive data, (iii) a service association of the sensitive data, and/or (iv) other factors. For example, information regarding the types of software/hardware, versions, and configurations thereof may be types of data that are rated as being highly sensitive. In contrast, information regarding power consumption or dates may be type of data that are rated as being of low sensitivity. Thus, the sensitivity level of the sensitive data of different portions may be different.

The redactions techniques may be applied by, for example, (i) replacing some of the portions with certain characters to remove information and indicate that redaction has occurred, and/or (ii) removing some of the portions without otherwise indicating that redaction has occurred. These different approaches may be redaction techniques, and the application of these techniques may depend on the identified sensitivity levels of the identified sensitive data. For example, sensitive data having a high level of sensitivity may be redacted via removal, while moderately sensitive data may be redacted via replacement with redaction indicator characters (e.g., stars such as by replacing "processor" with "*********"), and low sensitivity data may not be redacted at all. A redaction rating system that specifies the type of redaction to implement for different sensitivity levels for sensitive data may be used to identify the type of redaction to perform for each portion of sensitive data.

The manual review may be performed by the person may be performed by providing information regarding the sensitive data to a person (e.g., a person with sufficient privilege level), receiving feedback from the person regarding the sensitive data, and identifying the sensitivity level of the data based on the feedback from the person. In an embodiment, only information regarding the sensitive data (or some of the sensitive data, which may be controlled by the requestor) such as data type, service type, and/or other types of metadata may be provided to the provided. The contents of the sensitive data may not be provided to the person for review.

At operation 324, the diagnostic data package is provided to the data processing systems manager (or another entity indicated by a requestor). The diagnostic data package may be provided by sending the diagnostic data package to the data processing systems manager, or through another entity such as a storage.

The method may end following operation 324.

Using the method illustrated in FIG. 3B, embodiments disclosed herein may facilitate selective access to diagnostic data through proactive redaction ahead of dissemination of the diagnostic data. The method shown in FIG. 3B may be used in isolation from and/or in conjunction with the method illustrated in FIG. 3A.

Thus, as noted above, embodiments disclosed herein may provide one or more advantages including, for example: (i) encrypting collected diagnostic data with a double-keyed system, so that both the vendor and customer keys are required to unlock, (ii) use of vendor-generated keys to prevent the user from viewing data the vendor may deem sensitive, such as secrets as to the design and implementation of the system and/or execution environments, (iii) use of customer-generated keys to prevent the vendor from viewing data the customer has not approved, (iv) use of keys, and separation of keys and collected diagnostic data (e.g., a payload) to allow even the operator of the system to convey the collected diagnostic data without being able to see it (e.g., an operator may not be privileged or trusted to see contents of system), (v) integration with a system's methods for permissions, authorization and security, so only sufficiently privileged users are able view or transmit keys (to vendor), (vi) ability for a system to provide a mechanism whereby only a sufficiently privileged user can initiate an operation to have the encrypt the user-keys with the vendor-keys, and transmit them to the vendor, thereby eliminating a need to manually transferring keys or transferring user-keys to vendor in a secured manner (e.g., only visible to vendor) or may provide a mechanism to assure vendor can only decode collected data when authorized by a sufficiently-privileged user, (vii) generation of an ephemeral customer key on a per-use basis which may be supplied to the vendor, allowing decisions to be made as to access of the data by the vendor on a per-use basis, (viii) generation of ephemeral customer keys for different types of diagnostic data such as, for example, a memory dump and a general system log may be secured with different customer keys thereby allowing the customer to control which data the vendor may see on a per-use basis, (xi) use of either manual conveyance of keys (from customer to vendor), or an automatic system by which a customer can elect to transmit approved keys (to a secure vendor site), (x) use of other encryption keys or conventional passwords as a mechanism for security in the above cases, (xi) ability for a system to allow a sufficiently privileged user to preview data to be sent prior to encryption (to allow the user to decide if data should be transmitted or not), (xii) ability for the system to allow a sufficiently privileged user to sanitize (blackout) selected portions of the data prior to encryption (manually, via pattern rules, by class or category, by filters, selected services, time ranges, etc.), (xiii) ability for the system to proactively send collection bundles to a vendor in a manner which data still remains secured, even if the user has not yet authorized access to said data, and/or (xiv) ability for the system to transmit portions of data which are encrypted only with the vendor key, or no key at all.

Figure 4:
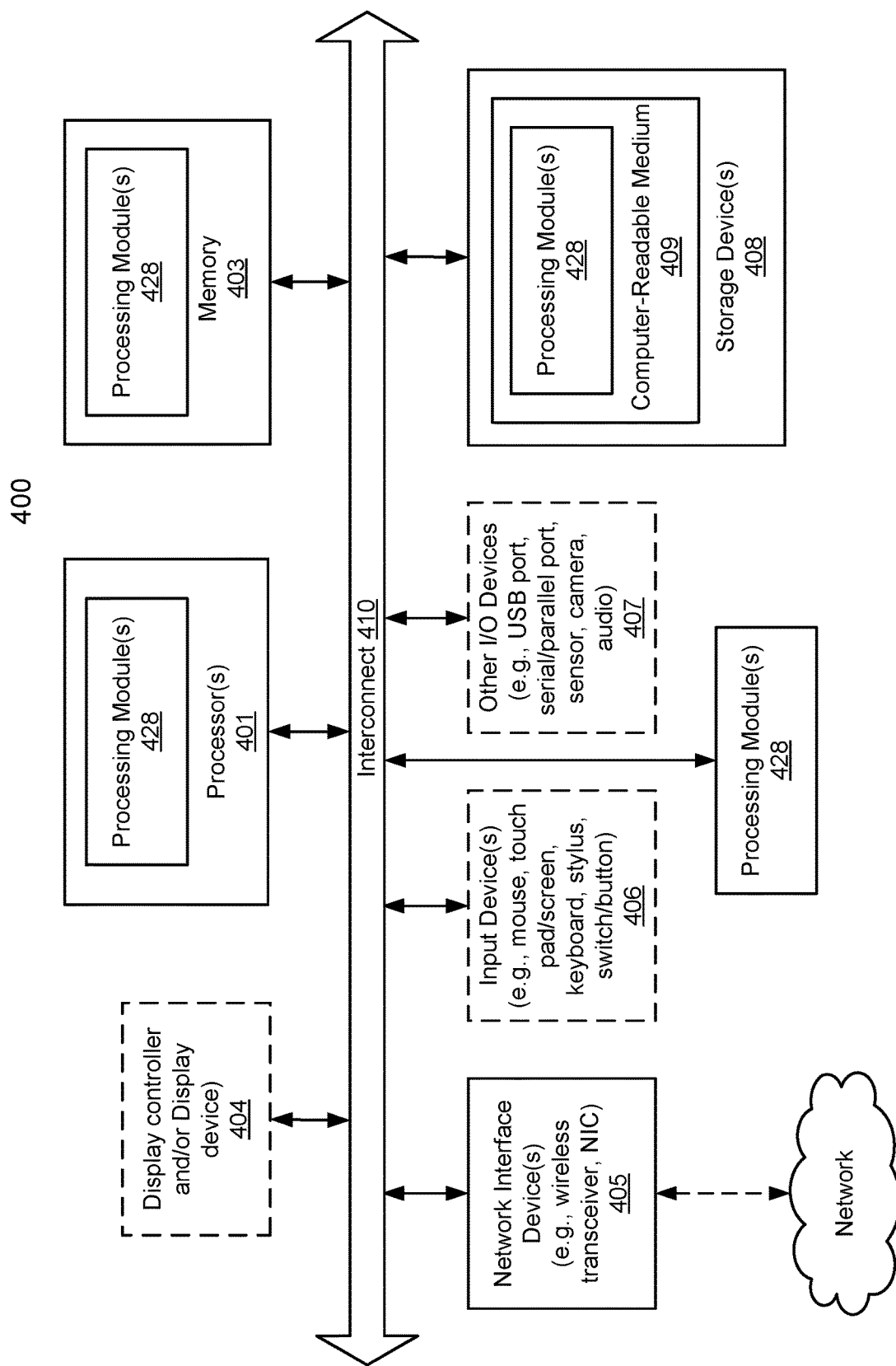
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of data processing systems through mediation of selective access to diagnostic data, the method comprising:
    identifying an occurrence of a collection event for the diagnostic data from a data processing system of the data processing systems, the collection event comprising a request for the diagnostic data, and the request comprising first encryption data;
    selectively redacting the diagnostic data to obtain a selectively redacted version of the diagnostic data based on sensitivity of portions of the diagnostic data;
    dual encrypting the selectively redacted version of the diagnostic data using the first encryption data and second encryption data different from the first encryption data to obtain a dual encrypted version of the selectively redacted version of the diagnostic data;
    obtaining a diagnostic data package comprising the dual encrypted version of the selectively redacted version of the diagnostic data; and
    providing the diagnostic data package to a data processing systems manager.

2. The method of claim 1, wherein
selectively redacting the diagnostic data comprises:
    presenting information regarding a subset of the portions of the diagnostic data provisionally selected for inclusion in the diagnostic data package to a privileged user that has a level of privilege that affords the privileged user with authority to disclose the subset of the portions of the diagnostic data to third parties;
    obtaining user feedback from the privileged use that is responsive to the presented information, the user feedback indicating:
        a first element of the subset of the portions of the diagnostic data is acceptable for third party disclosure, and
        a second element of the subset of the portions of the diagnostic data is not acceptable for third party disclosure; and
    obtaining the diagnostic data package comprises:
        adding the first element to the diagnostic data package; and
        adding a redacted version of the second element to the diagnostic data package.

3. The method of claim 2, wherein the redacted version of the second element comprises an empty data element.

4. The method of claim 2, wherein adding the redacted version of the second element comprises omitting all information regarding the second element from the diagnostic data package.

5. The method of claim 2, wherein the information regarding the subset of the portions of the diagnostic data comprises:
    type information for data elements of the subset of the portions of the diagnostic data.

6. The method of claim 5, wherein the information regarding the subset of the portions of the diagnostic data does not include contents of the data elements.

7. The method of claim 1, wherein obtaining the diagnostic data package comprising the dual encrypted version of the selectively redacted version of the diagnostic data comprises, at least:
    selecting, during the selectively redacting of the diagnostic data, a subset of the portions of the diagnostic data based on a sensitivity selection criteria;
    performing the dual encrypting on the subset of the portions using the first encryption data and the second encryption data;
    adding, after performing the dual encrypting of subset of the portions, the selected subset of the portions of the diagnostic data to the diagnostic data package; and
    omitting other portions of the diagnostic data that are not members of the subset from the diagnostic data package.

8. The method of claim 7, wherein the selection criteria comprises pattern rules.

9. The method of claim 7, wherein the selection criteria comprises at least one selected from a group of criteria consisting of time ranges, service types, and information types.

10. The method of claim 1, wherein the first encryption data is provided by a first entity that provided the request and the second encryption data is provided by a second entity that owns the diagnostic data, the second entity being different from the first entity.

11. The method of claim 10, wherein the dual encrypted version of the selectively redacted version of the diagnostic data protects sensitive data within the diagnostic data from being exposed in an event the diagnostic data package is comprised at least while being provided to the data processing systems manager.

12. A non-transitory machine-readable medium having instructions stored therein, which when executed by a processor, cause the processor to perform operations for managing operation of data processing systems through mediation of selective access to diagnostic data, the operations comprising:
    identifying an occurrence of a collection event for the diagnostic data from a data processing system of the data processing systems, the collection event comprising a request for the diagnostic data, and the request comprising first encryption data;

selectively redacting the diagnostic data to obtain a selectively redacted version of the diagnostic data based on sensitivity of portions of the diagnostic data;

dual encrypting the selectively redacted version of the diagnostic data using the first encryption data and second encryption data different from the first encryption data to obtain a dual encrypted version of the selectively redacted version of the diagnostic data;

obtaining a diagnostic data package comprising the dual encrypted version of the selectively redacted version of the diagnostic data; and providing the diagnostic data package to a data processing systems manager.

13. The non-transitory machine-readable medium of claim 12, wherein selectively redacting the diagnostic data comprises:
presenting information regarding a subset of the portions of the diagnostic data provisionally selected for inclusion in the diagnostic data package to a privileged user that has a level of privilege that affords the privileged user with authority to disclose the subset of the portions of the diagnostic data to third parties;

obtaining user feedback from the privileged use that is responsive to the presented information, the user feedback indicating:
a first element of the subset of the portions of the diagnostic data is acceptable for third party disclosure, and
a second element of the subset of the portions of the diagnostic data is not acceptable for third party disclosure; and obtaining the diagnostic data package comprises:
adding the first element to the diagnostic data package; and
adding a redacted version of the second element to the diagnostic data package.

14. The non-transitory machine-readable medium of claim 13, wherein the redacted version of the second element comprises an empty data element.

15. The non-transitory machine-readable medium of claim 13, wherein adding the redacted version of the second element comprises omitting all information regarding the second element from the diagnostic data package.

16. The non-transitory machine-readable medium of claim 13, wherein the information regarding the subset of the portions of the diagnostic data comprises:
type information for data elements of the subset of the portions of the diagnostic data.

17. A data processing system, comprising:
a processor; and
a memory coupled to the processor to store instructions, which when executed by the processor, cause the processor to perform operations for managing operation of data processing systems through mediation of selective access to diagnostic data, the operations comprising:

identifying an occurrence of a collection event for the diagnostic data from a data processing system of the data processing systems, the collection event comprising a request for the diagnostic data, and the request comprising first encryption data;

selectively redacting the diagnostic data to obtain a selectively redacted version of the diagnostic data based on sensitivity of portions of the diagnostic data;

dual encrypting the selectively redacted version of the diagnostic data using the first encryption data and second encryption data different from the first encryption data to obtain a dual encrypted version of the selectively redacted version of the diagnostic data;

obtaining a diagnostic data package comprising the dual encrypted version of the selectively redacted version of the diagnostic data; and providing the diagnostic data package to a data processing systems manager.

18. The data processing system of claim 17, wherein selectively redacting the diagnostic data comprises:
presenting information regarding a subset of the portions of the diagnostic data provisionally selected for inclusion in the diagnostic data package to a privileged user that has a level of privilege that affords the privileged user with authority to disclose the subset of the portions of the diagnostic data to third parties;

obtaining user feedback from the privileged use that is responsive to the presented information, the user feedback indicating:
a first element of the subset of the portions of the diagnostic data is acceptable for third party disclosure, and
a second element of the subset of the portions of the diagnostic data is not acceptable for third party disclosure; and obtaining the diagnostic data package comprises:
adding the first element to the diagnostic data package; and
adding a redacted version of the second element to the diagnostic data package.

19. The data processing system of claim 18, wherein the redacted version of the second element comprises an empty data element.

20. The data processing system of claim 18, wherein adding the redacted version of the second element comprises omitting all information regarding the second element from the diagnostic data package.

* * * * *